(12) United States Patent
Denton et al.

(10) Patent No.: US 9,608,828 B1
(45) Date of Patent: Mar. 28, 2017

(54) ELONGATED PHYSICAL UNCLONABLE FUNCTION

(71) Applicant: Lexmark International, Inc., Lexington, KY (US)

(72) Inventors: Gary Allen Denton, Lexington, KY (US); James Paul Drummond, Georgetown, KY (US); Brian Anthony Reichert, Lexington, KY (US); Randal Scott Williamson, Georgetown, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 15/192,177

(22) Filed: Jun. 24, 2016

Related U.S. Application Data

(63) Continuation-in-part of application No. 14/879,199, filed on Oct. 9, 2015, now Pat. No. 9,553,582.

(51) Int. Cl.

| | | |
|---|---|---|
| *G03G 21/00* | (2006.01) | |
| *H04L 9/32* | (2006.01) | |
| *G03G 15/08* | (2006.01) | |
| *B41J 2/175* | (2006.01) | |
| *G03G 21/18* | (2006.01) | |

(52) U.S. Cl.
CPC .......... *H04L 9/3278* (2013.01); *B41J 2/1755* (2013.01); *B41J 2/17543* (2013.01); *G03G 15/0863* (2013.01); *G03G 21/1875* (2013.01); *G03G 2221/1823* (2013.01)

(58) Field of Classification Search
CPC .. B41J 2/17543; B41J 2/17546; B41J 2/1755; G03G 15/0863; G03G 21/1875; G03G 2215/0695; G03G 2221/1823; H04L 9/3278
See application file for complete search history.

(56) References Cited

U.S. PATENT DOCUMENTS

| | | | | |
|---|---|---|---|---|
| 5,451,759 A | * | 9/1995 | Hoshino | G06K 7/084 235/449 |
| 7,865,722 B2 | * | 1/2011 | Moran | G06K 19/06196 713/161 |
| 9,524,456 B1 | * | 12/2016 | Ahne | G06K 19/06187 |
| 9,542,576 B1 | * | 1/2017 | Ahne | G06K 7/087 |

* cited by examiner

*Primary Examiner* — Alexander H Taningco
*Assistant Examiner* — Kurtis R Bahr

(57) ABSTRACT

An elongate physical unclonable function (PUF) is disclosed. The PUF has a longitudinal axis and contains a plurality of small magnetic particles. A much larger magnet is positioned on the longitudinal axis to indicate a home position. A low-cost linear translation mechanism may be used to read the PUF by referencing position information to the home position. Other devices are disclosed.

4 Claims, 6 Drawing Sheets

ELONGATED PHYSICAL UNCLONABLE FUNCTION

CROSS REFERENCES TO RELATED APPLICATIONS

This application is a continuation-in-part of Ser. No. 14/879,199 filed Oct. 9, 2015 and claims priority to it. The following applications are related and were filed contemporaneously: "INJECTION-MOLDED PHYSICAL UNCLONABLE FUNCTION", "ELONGATE PHYSICAL UNCLONABLE FUNCTION", "PHYSICAL UNCLONABLE FUNCTION ON A SUPPLY ITEM", and "TOOTHED-RACK PHYSICAL UNCLONABLE FUNCTION".

BACKGROUND

1. Field of the Disclosure

The present disclosure relates generally to anti-counterfeit systems and more particularly to physical unclonable functions.

2. Description of the Related Art

Counterfeit printer supplies, such as toner bottles, are a problem for consumers. Counterfeit supplies may perform poorly and may damage printers. Printer manufacturers use authentication systems to deter counterfeiters. Physical unclonable functions (PUF) are a type of authentication system that implements a physical one-way function. Ideally, a PUF cannot be identically replicated and thus is difficult to counterfeit. Thus, it is advantageous to maximize the difficulty of replicating a PUF to deter counterfeiters. It is also advantageous for the PUF and PUF reader to be low cost, robust, and repeatable.

SUMMARY

The invention, in one form thereof, is directed to an imaging device supply item having a body; an elongate PUF located on the body having a longitudinal axis and containing a plurality of magnetized particles each having a volume less than one cubic millimeter in a non-magnetic substrate; and a magnet having a volume of at least five cubic millimeters located on the body within five millimeters, inclusive, of the PUF located on the longitudinal axis of the PUF.

The invention, in another form thereof, is directed to an imaging device supply item having a body having a body surface; an elongate PUF located on the surface having a longitudinal axis, each particle has a volume that is less than one cubic millimeter and the majority of the particles have a magnetic pole orientation that is not orthogonal to the body surface; and a magnet that has a volume that is more than five cubic millimeters located between two and ten millimeters from the PUF and is located on the longitudinal axis and has a magnetic pole orientation that is orthogonal to the body surface.

BRIEF DESCRIPTION OF THE DRAWINGS

The accompanying drawings incorporated in and forming a part of the specification, illustrate several aspects of the present disclosure, and together with the description serve to explain the principles of the present disclosure.

DETAILED DESCRIPTION

In the following description, reference is made to the accompanying drawings where like numerals represent like elements. The embodiments are described in sufficient detail to enable those skilled in the art to practice the present disclosure. It is to be understood that other embodiments may be utilized and that process, electrical, and mechanical changes, etc., may be made without departing from the scope of the present disclosure. Examples merely typify possible variations. Portions and features of some embodiments may be included in or substituted for those of others. The following description, therefore, is not to be taken in a limiting sense and the scope of the present disclosure is defined only by the appended claims and their equivalents.

Figure 1:
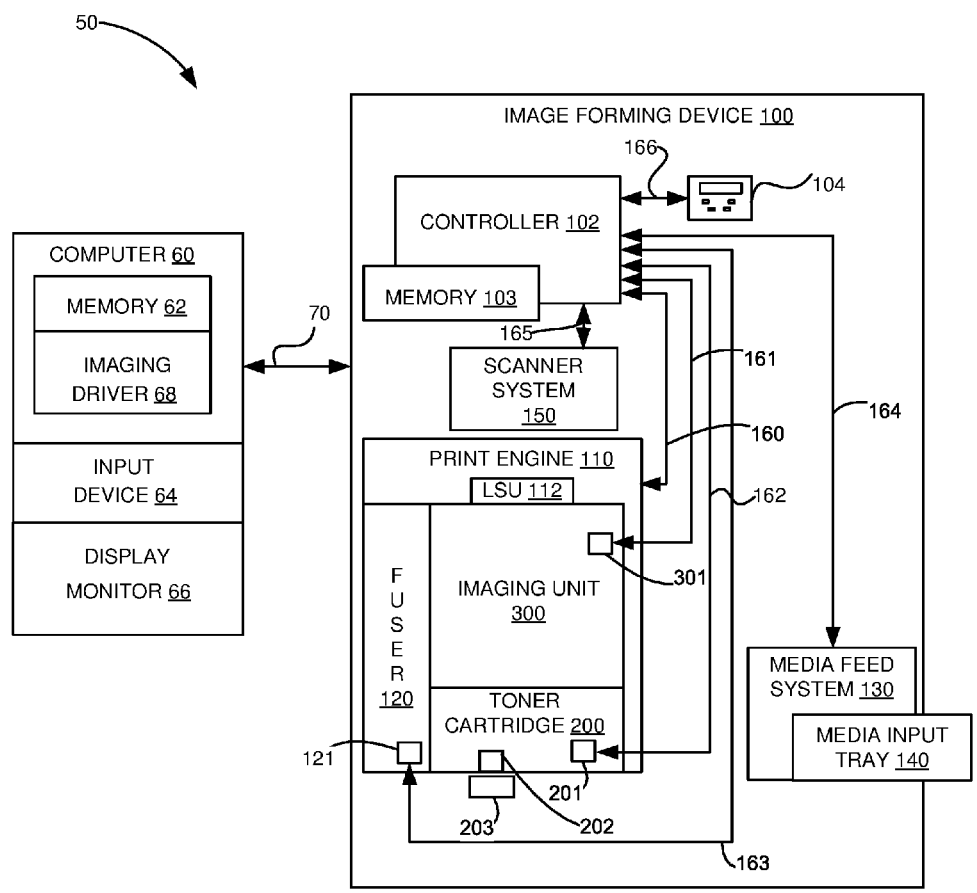
FIG. 1 is a block diagram of an imaging system including an image forming device according to one example embodiment.

Referring to the drawings and particularly to FIG. 1, there is shown a block diagram depiction of an imaging system 50 according to one example embodiment. Imaging system 50 includes an image forming device 100 and a computer 60. Image forming device 100 communicates with computer 60 via a communications link 70. As used herein, the term "communications link" generally refers to any structure that facilitates electronic communication between multiple components and may operate using wired or wireless technology and may include communications over the Internet.

In the example embodiment shown in FIG. 1, image forming device 100 is a multifunction device (sometimes referred to as an all-in-one (AIO) device) that includes a controller 102, a user interface 104, a print engine 110, a laser scan unit (LSU) 112, one or more toner bottles or cartridges 200, one or more imaging units 300, a fuser 120, a media feed system 130 and media input tray 140, and a scanner system 150. Image forming device 100 may communicate with computer 60 via a standard communication protocol, such as, for example, universal serial bus (USB), Ethernet or IEEE 802.xx. Image forming device 100 may be, for example, an electrophotographic printer/copier including an integrated scanner system 150 or a standalone electrophotographic printer.

Controller 102 includes a processor unit and associated memory 103 and may be formed as one or more Application Specific Integrated Circuits (ASICs). Memory 103 may be any volatile or non-volatile memory or combination thereof such as, for example, random access memory (RAM), read only memory (ROM), flash memory and/or non-volatile RAM (NVRAM). Alternatively, memory 103 may be in the form of a separate electronic memory (e.g., RAM, ROM, and/or NVRAM), a hard drive, a CD or DVD drive, or any memory device convenient for use with controller 102. Controller 102 may be, for example, a combined printer and scanner controller.

In the example embodiment illustrated, controller 102 communicates with print engine 110 via a communications link 160. Controller 102 communicates with imaging unit(s) 300 and processing circuitry 301 on each imaging unit 300 via communications link(s) 161. Controller 102 communicates with toner cartridge(s) 200 and non-volatile memory 201 on each toner cartridge 200 via communications link(s) 162. Controller 102 communicates with fuser 120 and processing circuitry 121 thereon via a communications link 163. Controller 102 communicates with media feed system 130 via a communications link 164. Controller 102 communicates with scanner system 150 via a communications link 165. User interface 104 is communicatively coupled to controller 102 via a communications link 166. Processing circuitry 121 and 301 may include a processor and associated memory such as RAM. ROM, and/or non-volatile memory and may provide authentication functions, safety and operational interlocks, operating parameters and usage information related to fuser 120, toner cartridge(s) 200 and imaging unit(s) 300, respectively. Controller 102 processes print and scan data and operates print engine 110 during printing and scanner system 150 during scanning.

Computer 60, which is optional, may be, for example, a personal computer, including memory 62, such as RAM, ROM, and/or NVRAM, an input device 64, such as a keyboard and/or a mouse, and a display monitor 66. Computer 60 also includes a processor, input/output (I/O) interfaces, and may include at least one mass data storage device, such as a hard drive, a CD-ROM and/or a DVD unit (not shown). Computer 60 may also be a device capable of communicating with image forming device 100 other than a personal computer such as, for example, a tablet computer, a smartphone, or other electronic device.

In the example embodiment illustrated, computer 60 includes in its memory a software program including program instructions that function as an imaging driver 68. e.g., printer/scanner driver software, for image forming device 100. Imaging driver 68 is in communication with controller 102 of image forming device 100 via communications link 70. Imaging driver 68 facilitates communication between image forming device 100 and computer 60. One aspect of imaging driver 68 may be, for example, to provide formatted print data to image forming device 100, and more particularly to print engine 110, to print an image. Another aspect of imaging driver 68 may be, for example, to facilitate the collection of scanned data from scanner system 150.

In some circumstances, it may be desirable to operate image forming device 100 in a standalone mode. In the standalone mode, image forming device 100 is capable of functioning without computer 60. Accordingly, all or a portion of imaging driver 68, or a similar driver, may be located in controller 102 of image forming device 100 so as to accommodate printing and/or scanning functionality when operating in the standalone mode.

Several components of the image forming device 100 are user replaceable e.g. toner cartridge 200, fuser 120, and imaging unit 300. It is advantageous to prevent counterfeiting these user replaceable components. A PUF 202 may be attached to the toner cartridge 200 to prevent counterfeiting as described below. A PUF reader 203 may be integrated into the image forming device 100 to verify the authenticity of the PUF 202. Data related to the PUF 202 may reside in non-volatile memory 201 and is preferably encrypted. This data may be generated at the time of manufacture by measuring the PUF 202 at the factory. The non-volatile memory 201 is preferably located on the supply item along with the PUF 202. To verify the authenticity of the PUF 202, the image forming device 100 measures the magnetic field generated by the PUF 202 in one or more directions along a measurement path and compares these measurements to data in the non-volatile memory 201.

Figure 2:
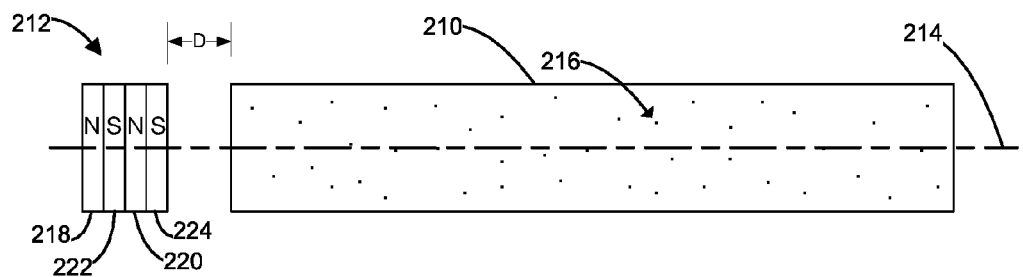
FIG. 2 is a side view of an elongate PUF.

FIG. 2 shows a PUF 210 next to a magnet 212. The PUF 210 is elongate and has a longitudinal axis 214. The PUF 210 contains a plurality of magnetized particles 216 each having a volume less than one cubic millimeter. The magnetized particles 216 may be, for example, flakes of an alloy of neodymium, iron and boron (NdFeB). The magnet 212 is located on the longitudinal axis 214 and is separated from the PUF 210 by a distance D. Preferably, the magnet 212 has a volume of at least five cubic millimeters so that the magnet's magnetic field is much greater than the magnetic field of a particle 216.

The PUF 210 may be read by moving a magnetic sensor along the longitudinal axis 214. The magnetic sensor will have a much higher reading when positioned over the magnet 212 and thus the magnet 212 designates a home position from which readings of the PUF may be referenced spatially. Preferably, the distance D is five millimeters or less to minimize the overall travel of the positioning mechanism of the magnetic sensor to reduce cost. Preferably, the PUF 210 and magnet 212 are mounted to a planar surface, the magnetic sensor measures orthogonal to the surface, the magnet has a magnetic pole orientation that is orthogonal to the surface, and the majority of the particles 216 have a magnetic pole orientation that is not orthogonal to the body surface. This is to maximize the difference between measurements of the magnet 212 and the particles 216 to give a clear home position signal. The magnetic sensor may measure along multiple orthogonal directions.

Preferably, the magnet 212 has multiple north poles 218, 220 and south poles 222, 224 that alternate in polarity along the longitudinal axis of the PUF. The magnet 212 may be fabricated by joining discrete magnets having alternating poles into one magnet. The alternating poles limits the magnetic field seen by the particles 216 and thus limits the effect of the magnet 212 on the particles 216. This allows the magnet 212 to be placed near the PUF 210 without disturbing the signature of the PUF 210.

Figure 3:
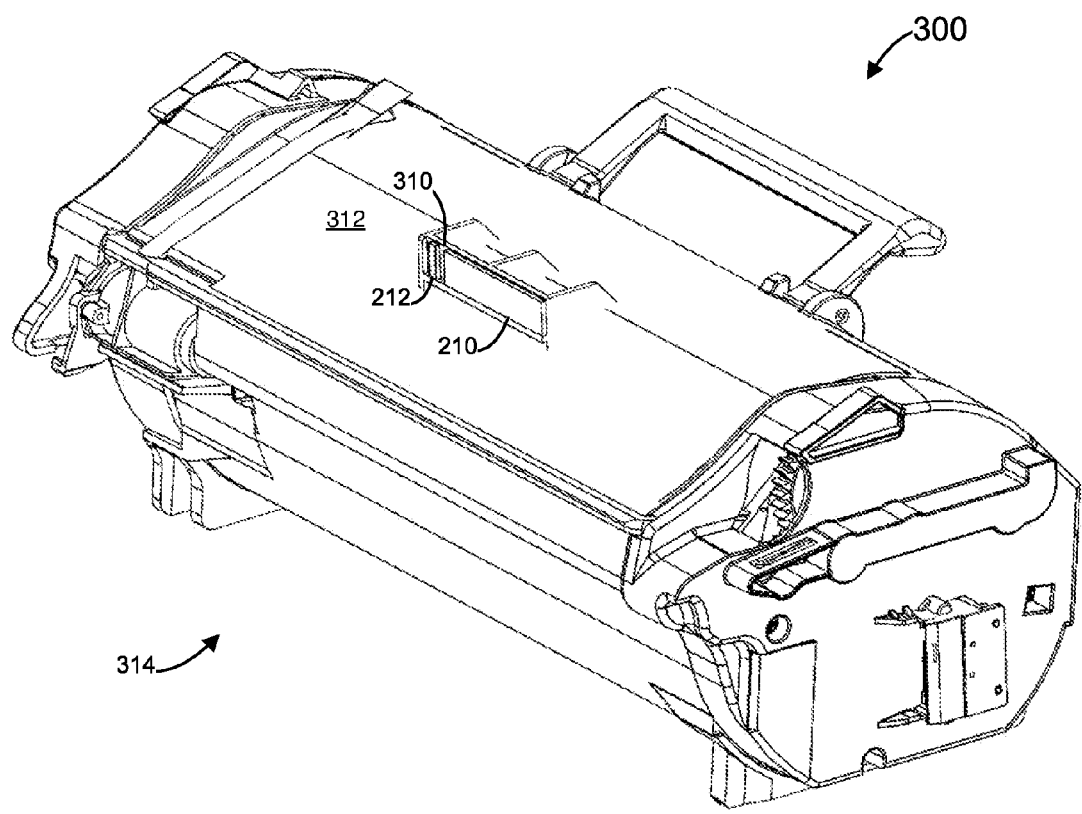
FIG. 3 and FIG. 4 are isometrics views of an imaging device supply item having the elongate PUF.

FIG. 3 shows an imaging device supply item 300, for example a toner bottle, with the PUF 210 and magnet 212 located on a surface 310 of a body 312 located on the back side 314 of the body 312. The PUF 210 and magnet 212 may be used by an imaging device to verify the authenticity of the supply item 300.

Figure 4:
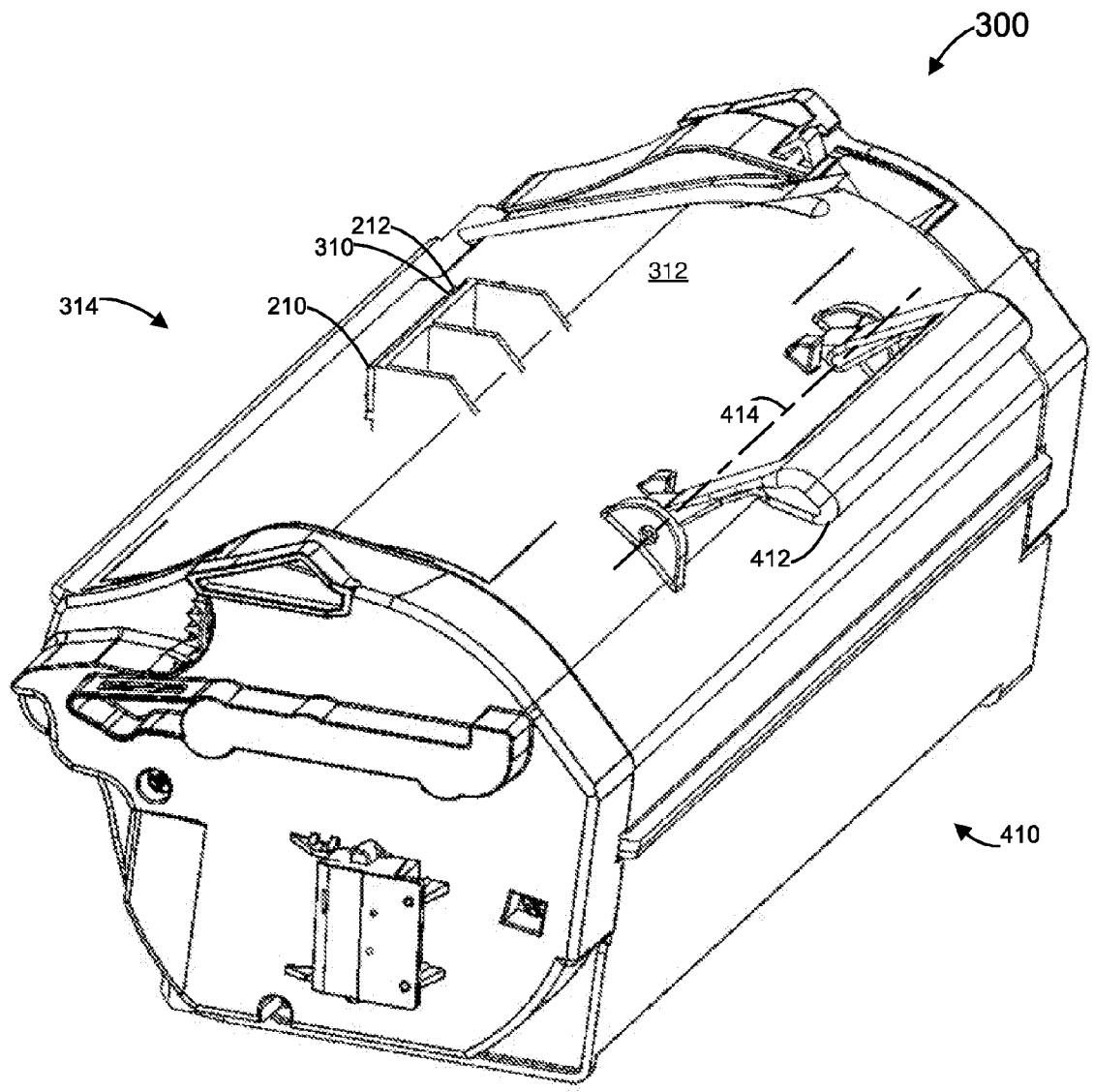

FIG. 4 shows the front side 410 of the body 312 including a handle 412 located on the front side 410. The handle 412 is configured to pivot about a pivot axis 414 that is parallel to the PUF longitudinal axis 214. The pivot axis 414 is parallel to the longitudinal dimension of the body 312, which allows a larger, and thus easier to use handle 412 than if the handle was rotated ninety degrees. Similarly, the PUF longitudinal axis 214 is parallel to the longitudinal dimension of the body 312, which allows a longer and thus more difficult to clone PUF. It is preferential to locate the PUF 210 on the back side 314 so the magnetic sensor may be protected by being as far from the user as possible. Also, the magnetic sensor may be spring biased toward the PUF 210 to insure proper gap spacing for accurate measurements without being in the insertion path of the imaging device supply item 300.

Figure 5:
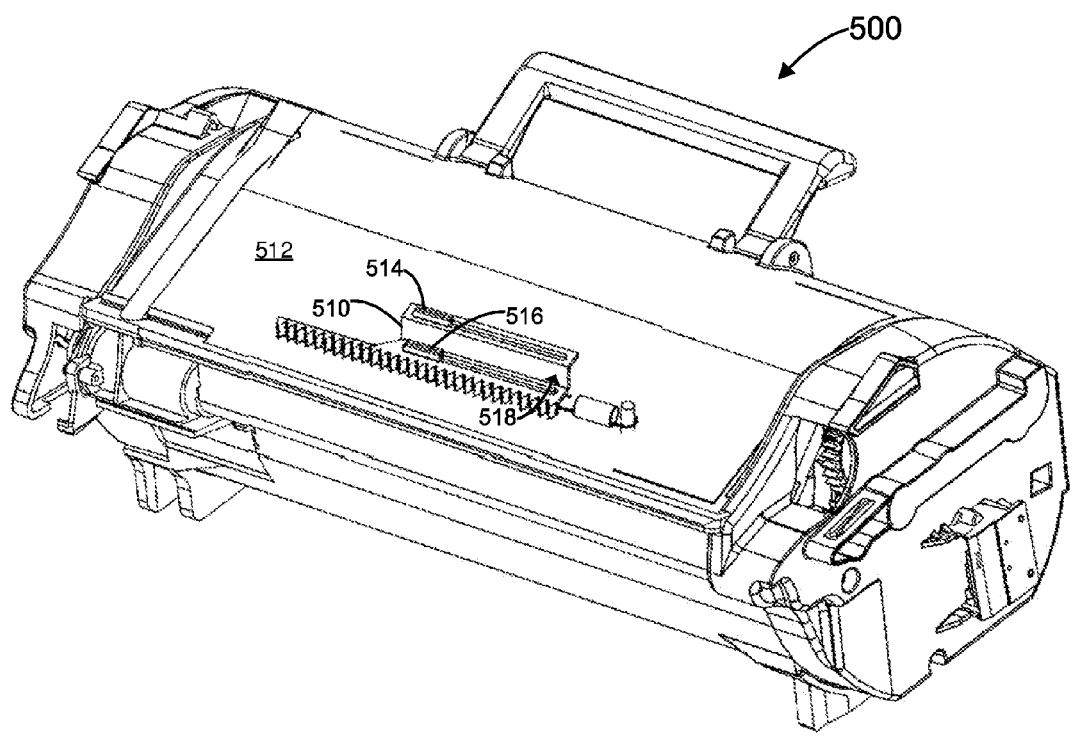
FIG. 5 and FIG. 7 are isometric views of an imaging device supply item having a toothed-rack PUF.

FIG. 5 shows an imaging device supply item 500 having a PUF 510 slidably attached to a body 512 by a pair of snaps 514, 516. At least one face 518 of the PUF 510 contains magnetic particles as described previously.

Figure 6:
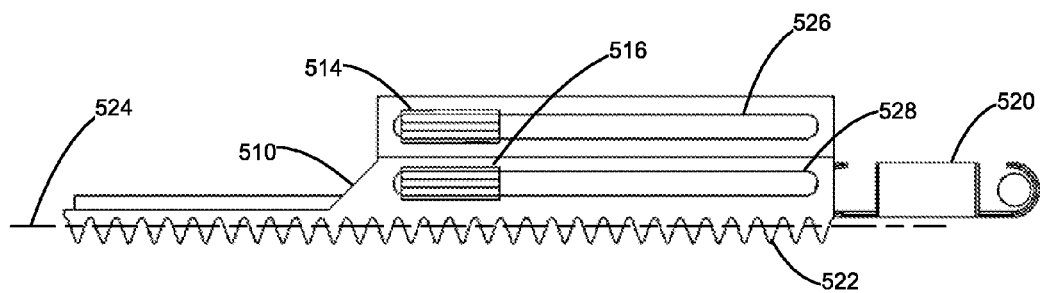
FIG. 6 is a top view of the toothed-rack PUF.

FIG. 6 shows a top view of the PUF 510, snaps 514, 516, and a spring 520. The PUF 510 has a toothed rack 522 having a longitudinal axis 524. The PUF 510 has slots 526, 528 that, together with the snaps 514, 516, constrain the PUF 510 to move linearly relative to the body 512 parallel to the longitudinal axis 524.

An imaging device reads the PUF 510 using a stationary magnetic sensor. The PUF 510 is moved linearly by mating a gear with the teeth of the toothed rack 522 and turning the gear. Preferably, the PUF moves at least ten millimeters to read a sufficient length of the PUF 510 to make it difficult to counterfeit the PUF 510. It is preferable to use a stationary magnetic sensor to reduce cost. The PUF 510 is returned to a home position, e.g. against the snaps 514, 516, by the spring 520.

Figure 7:
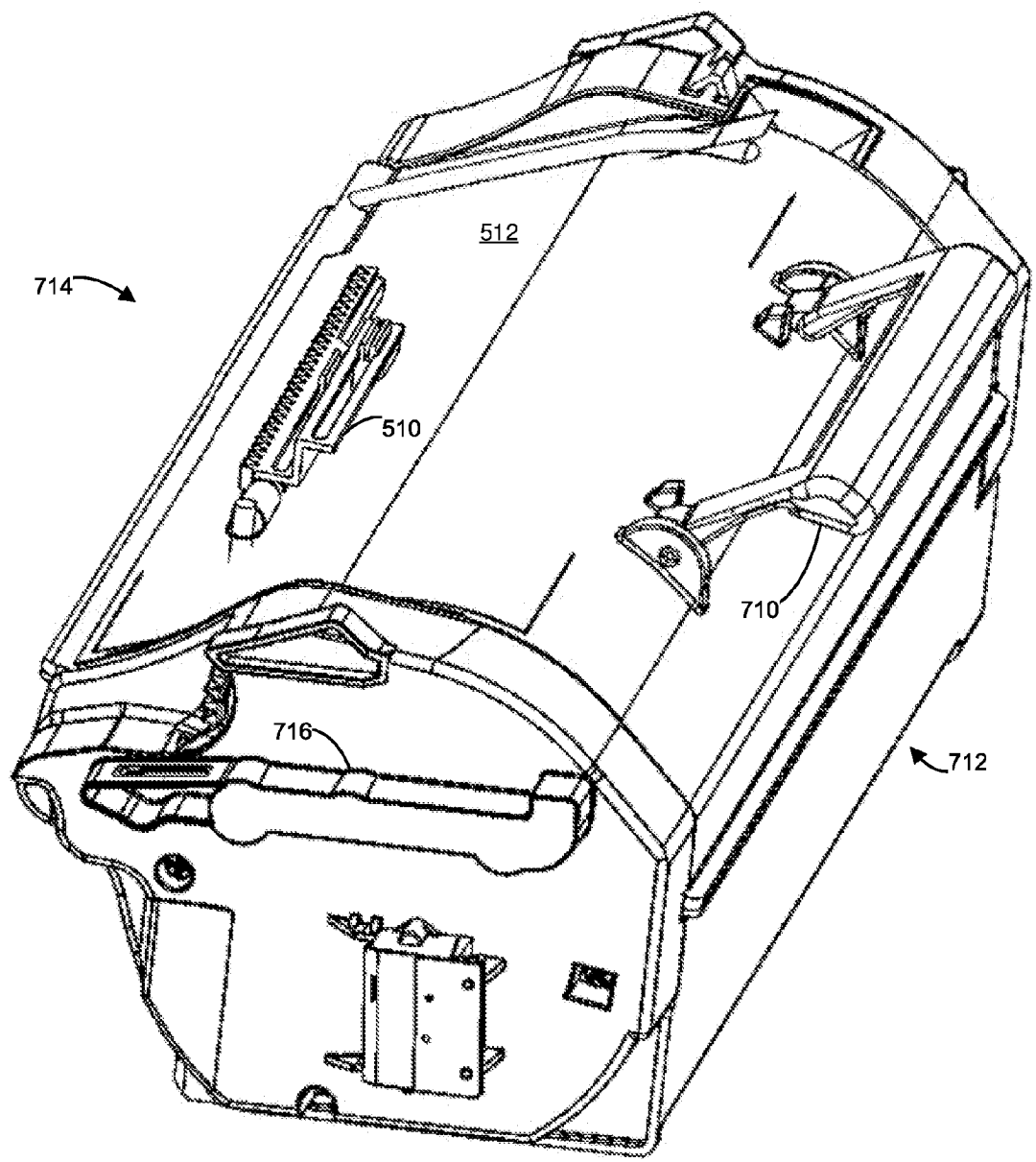

FIG. 7 shows another view of the supply item 500. A handle is located on the front side 712 of the body opposite the PUF 510 located on the back side 714 of the body. The insertion path of the supply item 500 is defined by rails 716 that run front-to-back. Thus, it is preferable to locate the PUF 510 on the back side 714 to simplify mating with the gear used to move the PUF 510.

Figure 8:
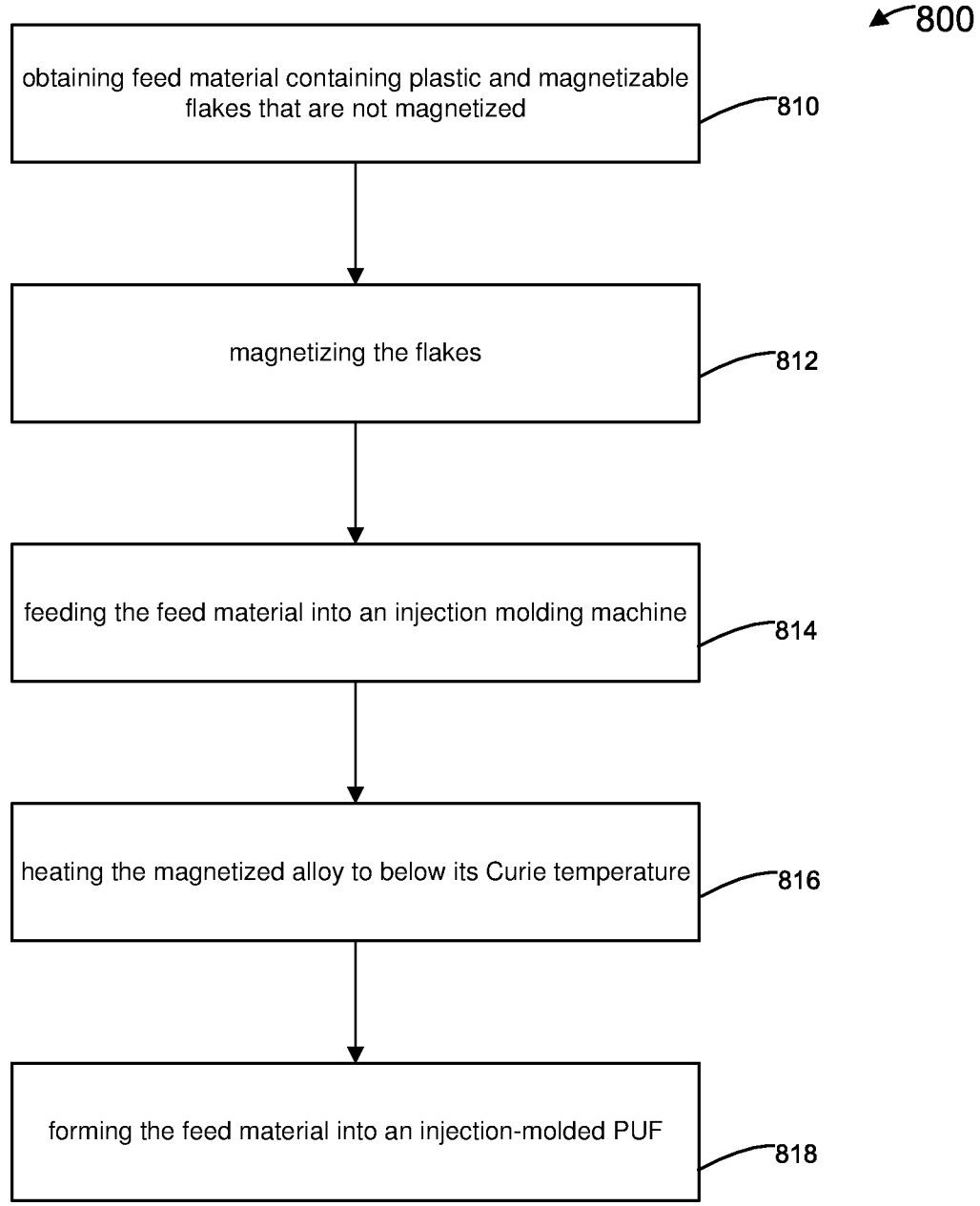
FIG. 8 is a flowchart of a method of manufacturing a PUF.

FIG. 8 shows a flowchart of a method of manufacturing a PUF. The method 800 uses an injection molding machine to make an injection-molded PUF. As is known in the art, injection molding machines heat feed material until it is molten and then forces the feed material through a nozzle into a mold cavity. Once the material is cooled enough to harden, the injection molded part is ejected from the injection molding machine.

At block 810, feed material is obtained containing plastic and magnetizable flakes that are not magnetized. The plastic may be, for example, a thermoplastic, a thermosetting polymer, etc. The magnetizable flakes may be, for example, an alloy of neodymium, iron and boron. Other magnetizable particles may be used, for example, spheres, rods, etc. Preferably, the feed material contains between ten and twenty percent, inclusive, by weight magnetizable flakes to maximize the variability in the magnetic signature of the PUF while maintaining good flow within the mold.

At block 812, the flakes are magnetized. Alternatively, feed material may be used that contains pre-magnetized flakes. It is preferable to magnetize the flakes after they are enveloped by the plastic to prevent the flakes from clumping together.

At block 814, the feed material is fed into an injection molding machine. The feed material may be fed as solid pellets containing plastic and magnetic material, pellets containing plastic as well as pellets containing both plastic and magnetic material, etc.

At block 816, the magnetized alloy is heated to below its Curie temperature. It is necessary to heat the feed material so that it will flow into the mold. However, it is preferable to avoid heating the magnetized alloy to above its Curie temperature to avoid degrading the magnetic fields generated by the magnetic particles.

At block 818, the feed material is formed into an injection-molded PUF. For example, the feed material may be forced through one or more nozzles into a mold cavity. The turbulent flow of the feed material through the nozzle and through the mold cavity creates a random distribution and orientation of the magnetic particles, which creates a highly random magnetic signature for each PUF. The random magnetic signature makes it very difficult to reproduce a PUF. This process may economically produce the toothed-rack PUF 510 described above.

The foregoing description illustrates various aspects and examples of the present disclosure. It is not intended to be exhaustive. Rather, it is chosen to illustrate the principles of the present disclosure and its practical application to enable one of ordinary skill in the art to utilize the present disclosure, including its various modifications that naturally follow. All modifications and variations are contemplated within the scope of the present disclosure as determined by the appended claims. Relatively apparent modifications include combining one or more features of various embodiments with features of other embodiments.

What is claimed is:

1. An imaging device supply item comprising:
   a body;
   an elongate physical unclonable function (PUF) located on the body having a longitudinal axis and containing a plurality of magnetized particles each having a volume less than one cubic millimeter in a non-magnetic substrate; and
   a magnet having a volume of at least five cubic millimeters located on the body within five millimeters, inclusive, of the PUF located on the longitudinal axis of the PUF.

2. The imaging device supply item of claim 1, wherein the magnet has multiple magnetic poles that alternate in polarity along the longitudinal axis of the PUF.

3. The imaging device supply item of claim 2, wherein the pole spacing is between half a millimeter and five millimeters inclusive.

4. An imaging device supply item comprising:
   a body having a body surface;
   an elongate physical unclonable function (PUF) located on the surface having a longitudinal axis, each particle has a volume that is less than one cubic millimeter and the majority of the particles have a magnetic pole orientation that is not orthogonal to the body surface; and
   a magnet that has a volume that is more than five cubic millimeters located between two and ten millimeters from the PUF and is located on the longitudinal axis and has a magnetic pole orientation that is orthogonal to the body surface.

* * * * *